UNITED STATES PATENT OFFICE.

FRANK MONTGOMERY WOOD, OF CHICAGO, ILLINOIS.

PROCESS OF PREPARATION OF LIQUID CULTURES OF NITRIFYING BACTERIA.

1,341,030.   Specification of Letters Patent.   Patented May 25, 1920.

No Drawing.   Application filed July 24, 1919.   Serial No. 312,940.

*To all whom it may concern:*

Be it known that I, FRANK MONTGOMERY WOOD, a citizen of the United States, residing at 6712 Edison Park Ave., Chicago, in the county of Cook and State of Illinois, have invented a new and useful Process of Preparation of Liquid Cultures of Nitrifying Bacteria, of which the following is a specification.

My invention relates to the process of cultivating nitrifying bacteria from the roots of legumes in liquid emulsion composed of water, soil and decaying vegetable matter, and the preparation of liquid cultures of nitrifying bacteria.

Its object is to provide a new method of the cultivation of nitrifying bacteria for increasing soil fertility, and to enhance the vitality of the bacteria and to keep the cultures alive longer than has been possible heretofore, and afford an inexpensive method of the application of these bacteria to the seed and the soil, for the purpose of nitrifying the latter and aiding the growth of such crops as are benefited by nitrification.

To accomplish this object a variety of legumes, such as one, two or three year old sweet clover, white clover, peas, beans, alsike and others bearing root nodules are pulled from the soil, so as to produce a polyvalent, many strain culture of nitrifying bacteria. These nodules are then crushed, either between rollers, or with a mallet, and then immersed in water, preferably in rain water, in the proportion of about one large root with its crushed nodules to each gallon of water; and the preparation is made in any open receptacle, such as a keg or tank of wood, or of metal or concrete construction.

To the water and other elements is then added sufficient garden earth with well rotted manure in equal parts to cover the bottom of the receptacle, such material being intended to provide nourishment for the growth of the bacteria.

This solution is then allowed to stand in the open air in a place warmed by the sun for four or five days until a strong emulsion of the nitrifying bacteria is obtained.

The emulsion may be examined and tested by culture on beef blood serum and agar agar culture media to prove out the presence of nitrifying bacteria, nitros o-cocci and nitrosomonas, and the same identified, and then used on seed and growing plants.

I am aware it is not new to employ dry media in the propagation of and attempt to keep alive nitrogen bacteria by various methods, and such I do not broadly claim. Dry media for the purpose fails to keep the bacteria vital for sufficient length of time to be of commercial value for soil inoculation (which is the crux of the whole process), and, in lieu thereof, I obtain, by the means aforesaid, a liquid product wherein the nitrogenous bacteria are not only propagated, but are kept alive and remain vital until applied by the husbandman, by being constantly suspended in a solution which is rich in the elements upon which they feed. This liquid product, in form of an emulsion, cultures and keeps alive the nitrifying bacteria, and also serves as a sprout for further propagating such bacteria, and affords improved means for supplying the nitrifying bacteria to the soil, and a more practical method than heretofore of applying such bacteria to seeds and plants.

I claim:

The process of growing nitrifying bacteria for soil fertilization and keeping cultures of such bacteria vital, consisting in immersing crushed nodules from legumes in water, adding to the resulting mixture garden earth and well rotted manure in equal parts, and exposing the solution to a sun-warmed atmosphere until a strong emulsion is obtained, substantially as described.

In witness whereof I hereunto set my hand this 10th day of July, 1919.

FRANK MONTGOMERY WOOD.

In presence of two witnesses:
EMILY JANETTE RICHARDS,
R. J. WELLS.